United States Patent [19]

Bailey et al.

[11] 4,272,189
[45] Jun. 9, 1981

[54] ELECTRO-OPTICAL PROJECTILE ANALYZER

[75] Inventors: Theodore B. Bailey; Jack Bates, both of Ridgecrest, Calif.

[73] Assignee: The United States of America as represented by the Secretary of the Navy, Washington, D.C.

[21] Appl. No.: 67,089

[22] Filed: Aug. 16, 1979

[51] Int. Cl.³ .................. G01P 3/36; G01V 9/04
[52] U.S. Cl. ................... 356/28; 250/222 R; 250/225; 250/227; 356/385
[58] Field of Search ............ 250/221, 222 R, 560, 250/225, 227; 356/385, 28; 324/178

[56] References Cited

U.S. PATENT DOCUMENTS

| | | | |
|---|---|---|---|
| 3,047,723 | 7/1962 | Knapp | 250/222 |
| 3,566,130 | 2/1971 | Aldrich et al. | 250/225 |
| 3,727,069 | 4/1973 | Crittenden, Jr. et al. | 250/222 R |
| 3,764,813 | 10/1973 | Clement et al. | 250/221 |
| 3,764,813 | 10/1973 | Clement et al. | 250/221 R |
| 3,770,353 | 11/1973 | Brown et al. | 356/152 |
| 3,807,858 | 4/1974 | Finch | 356/1 |
| 3,809,891 | 5/1974 | Erdman et al. | 250/222 R |
| 3,830,568 | 8/1974 | Allen | 356/28.5 |
| 3,833,299 | 9/1974 | Lang | 356/28 |
| 3,860,754 | 1/1975 | Johnson et al. | 250/222 R |
| 3,876,877 | 4/1975 | Meulensteen et al. | 250/222 R |
| 3,897,151 | 7/1975 | Lecroy | 356/5 |

*Primary Examiner*—Stephen C. Buczinski
*Attorney, Agent, or Firm*—R. S. Sciascia; W. Thom Skeer; Kenneth G. Pritchard

[57] ABSTRACT

A device for determining the velocity, trajectory and attitude of a projectile. Light beams from two perpendicular linear arrays of light emitters are incident upon corresponding linear photodetector arrays. Each light beam in the linear arrays includes an individualized characteristic to permit unique identification of each beam. Trajectory and velocity parameters are determined by identifying which detectors have an interrupted light beam and from the time interval between actuation of the arrays.

8 Claims, 7 Drawing Figures

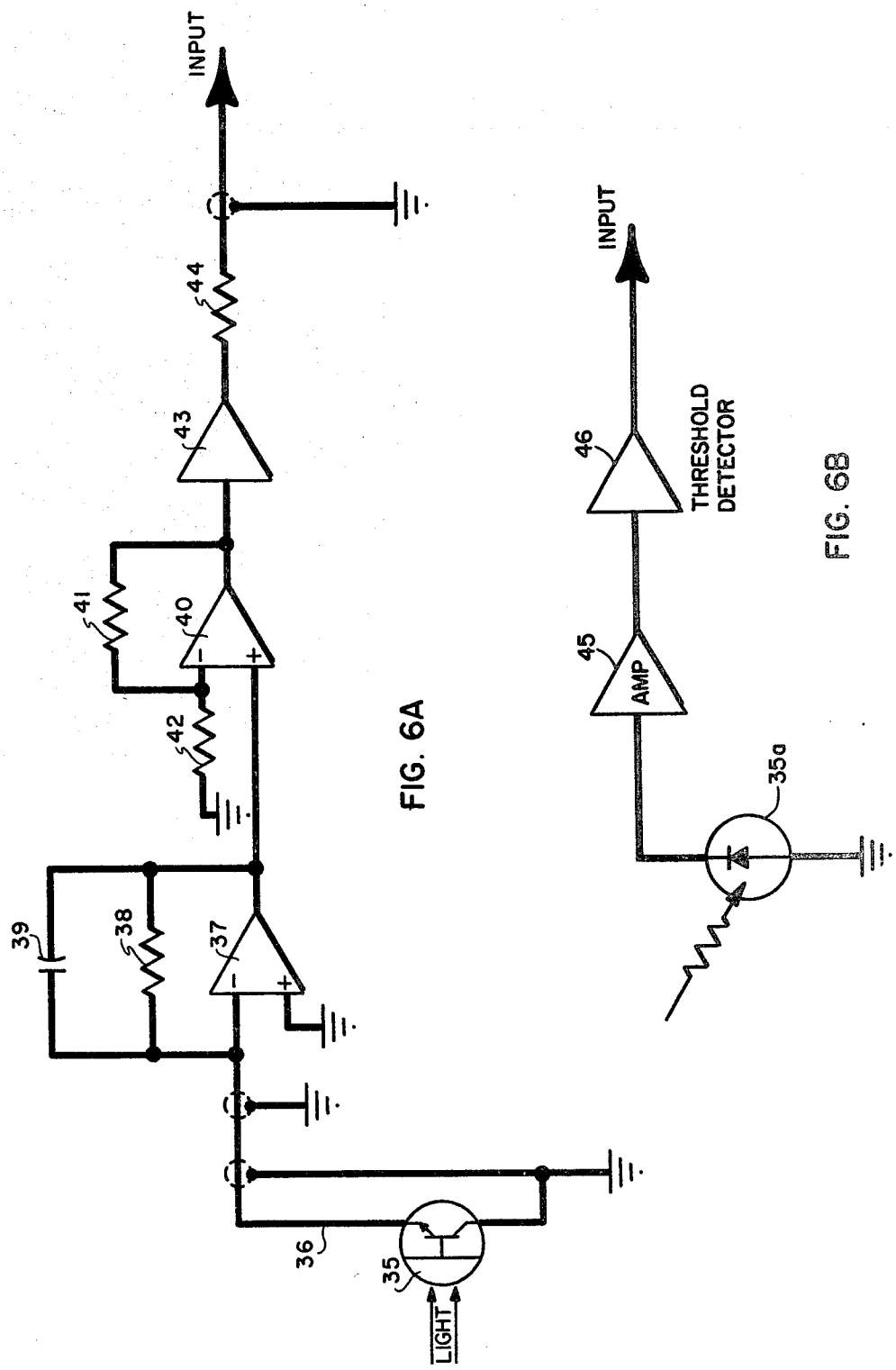

ELECTRO-OPTICAL PROJECTILE ANALYZER

BACKGROUND OF THE INVENTION

1. Field of the Invention

The present invention generally pertains to systems for determining the position, velocity, and attitude of a projectile passing through a target area. More particularly, the present invention pertains to systems which utilize the interruption of crossing light beams for determining the position, velocity, and attitude of a projectile.

2. Description of the Prior Art

There are prior art coordinate detection systems which use overlapping beams of light and photoelectric detectors to determine where a projectile hits a target. Having a detector which is sensitive to overlapping beams makes the projectile appear larger than its actual size, thereby limiting the accuracy of the system. Some attempts to minimize this limitation in accuracy result in devices in which alignment of light beams with corresponding light receptors is critical.

Other prior art coordinate detection systems use linear arrays of light emitting diodes which are sequentially pulsed. It is possible for a high-velocity projectile to at least partially pass through such a system without being detected. This results in a loss of information about the trajectory.

SUMMARY OF THE INVENTION

The present invention provides a system for determining the position, pitch, yaw, and velocity of a projectile passing through a target area. The system is capable of measuring each projectile fired in rapid fire operations. Fiber optics transmit light from a continuous light source and divide the beam into a plurality of beams to form two perpendicular linear emitter arrays. Detector arrays provide a photodetector corresponding to each beam in the emitter arrays. The beams from the emitter arrays are polarized, with adjacent emitters having perpendicular planes of polarization. The optical path of each photodetector contains a polarizing filter having a plane of polarization the same as that of the corresponding emitter. Therefore, the problem of cross-talk between channels caused by overlapping beams is overcome because each detector effectively sees only the corresponding emitter.

Whenever the light beam corresponding to a given detector is interrupted, that detector sends a signal to circuitry which processes the signal into a form appropriate for inputting to a micro-computer. The micro-computer uses the signals to calculate the desired information and may be connected to either a printer or an optical display for readout.

BRIEF DESCRIPTION OF THE DRAWINGS

FIGS. 6A and 6B illustrate detector circuits that can be used in the invention.

DESCRIPTION OF THE PREFERRED EMBODIMENT

Figure 1:
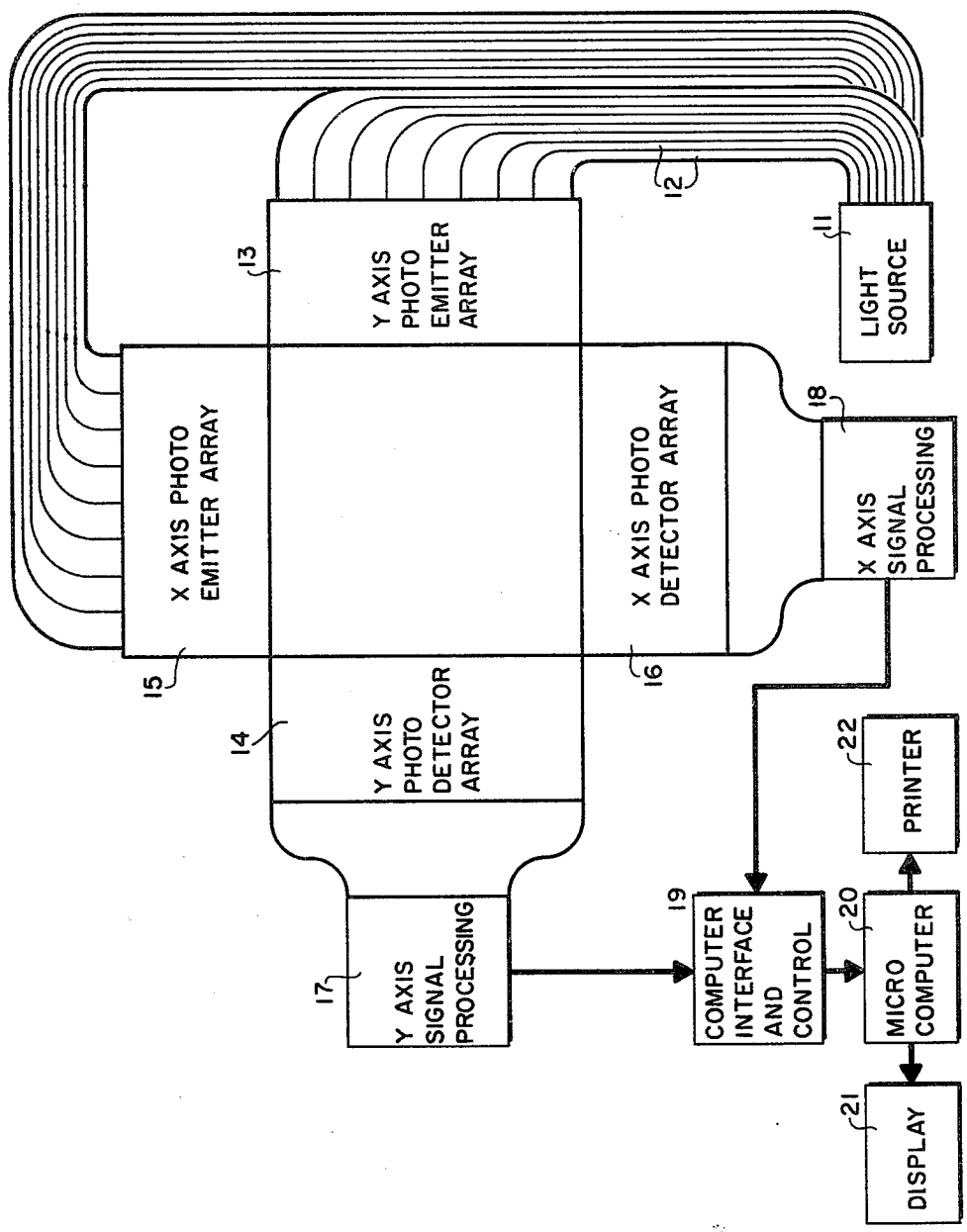
FIG. 1 is a block diagram of the invention.

Referring to FIG. 1, a light source 11, which may be a semi-collimated xenon lamp, has a continuous output taken therefrom by a fiber optics transmission system 12. Fiber optics transmission system 12 separates the beam from light source 11 into a plurality of beams, half of which are configured to form a first linear array 13 of light emitters for the y-axis; and the other half of which are configured to form a second linear array 15 of light emitters for the x-axis. A developmental model of the invention had eight light emitters in each array. A first linear array of detectors 14 for the y-axis is placed opposite emitter array 13 so that there is a detector corresponding to each emitter in the optical path defined thereby. A second linear array of photodetectors 16 for the x-axis is placed opposite emitter array 15 with a detector corresponding to each emitter in the same manner. Interruption of the light beam incident upon a detector causes the detector to generate a detector output signal.

The output of photodetector array 14 is connected to y-axis signal processing circuitry 17; and, similarly, the output of photodetector array 16 is connected to x-axis signal processing circuitry 18, which are connected through computer interface and control circuitry 19 to a micro-computer 20. Micro-computer 20 is programmed to utilize signals input thereto to calculate the position, attitude, and velocity of a projectile passing through the area defined by emitter array 13 and 15 and detector arrays 14 and 16. The computer output may be shown on alpha-numeric display 21 or on a printer 22.

Figure 2:
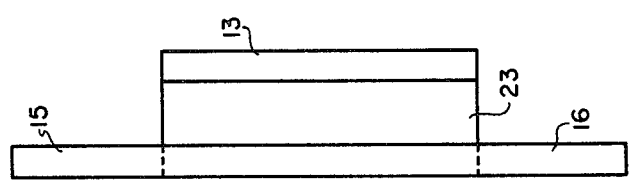
FIG. 2 shows the x and y-axis arrays having a space therebetween.

FIG. 2 shows emitter array 13, emitter array 15, and photodetector array 16 with a space 23 between the two perpendicular arrays. A projectile passing through the system will be detected at different times by detector array 14 and detector array 16. The length of spacer 23 an the time interval between actuation of the first and second detector arrays are used to calculate the velocity of the projectile.

Figure 3:
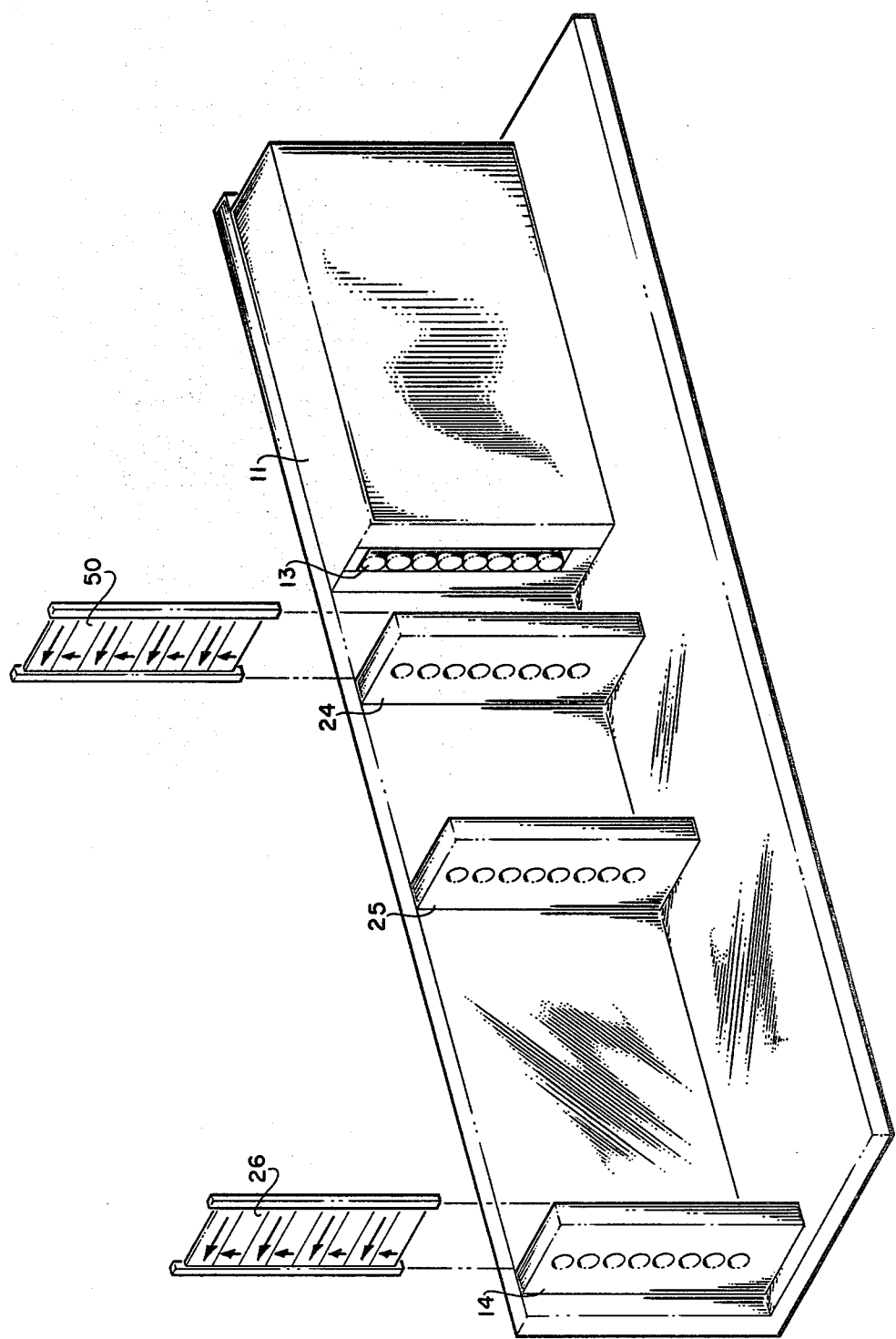
FIG. 3 illustrates an emitter and detector array with polarizing filters.

FIG. 3 shows a method to eliminate the problem of cross-talk between channels. It is desirable that a detector respond to light only from its corresponding emitter. Light from each emitter in linear emitter array 13 passes through baffles 24 and 25 before impinging upon photodetector array 14. A polarizing means, which may be an array of emitter polarizing filters 50, is placed in the optical path of each emitter in emitter array 13. Emitter polarizing filters 50 provide perpendicular planes of polarization for adjacent emitters. An array of detector polarizing filters 26 is placed adjacent to photodetector array 14. Detector polarizing filter array 26 has a filter in the optical path between each emitter in emitter array 13 and the corresponding detector in photodetector array 14. The plane of polarization of each detector polarizing filter is the same as the plane of polarization of the corresponding emitter. An array of baffles and polarizing filters similar to that described is provided between photoemitter array 15 and photodetector array 16. In addition to polarizers, cross-talk between channels can be eliminated by spectral filtering on adjacent channels or modulating the light beams at high frequency and frequency coding adjacent channels.

Figure 4:
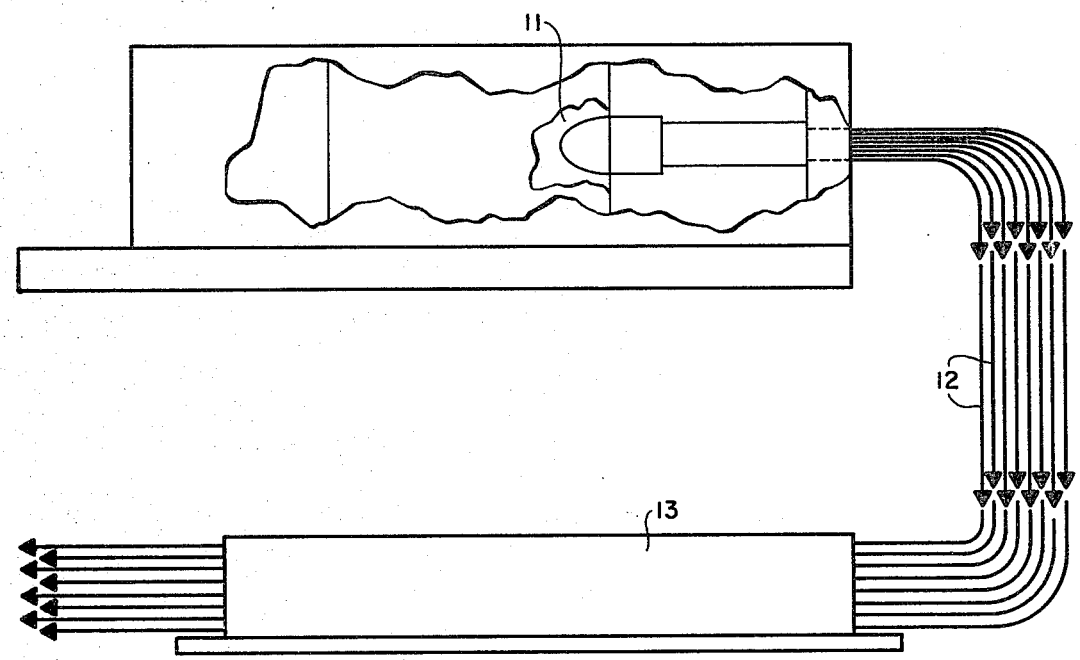
FIG. 4 shows the y-axis emitter array connected to a light source by fiber optics.

FIG. 4 shows how fiber optics transmission system 12 forms photoemitter array 13.

Figure 5:
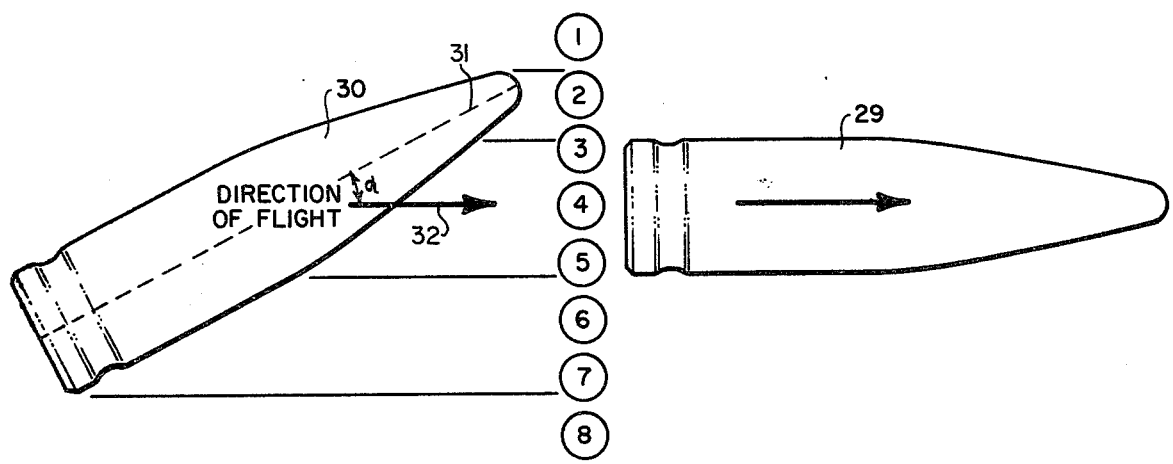
FIG. 5 illustrates how the number of detectors intersected by a projectile is related to the attitude of the projectile.

FIG. 5 shows a projectile 29 traveling straight through the array and cutting across a minimum number of light beams and a projectile 30 which is pitching or yawing so that it cuts across more than the minimum number of light beams. The angle of pitch and yaw may be determined from the number of light beams interrupted by the projectile, and direction of pitch and yaw may be determined from the order in which the beams are broken. Light beams 1–8 represent either y-axis photo-emitter array 13 or x-axis photo-emitter array 15. If beams 1–8 represent the x-axis, then projectile 30 is being viewed from either above or below and the angle α between axis of symmetry 31 and direction of flight arrow 32 represents the amount of yaw. A similar y-axis arrangement perpendicular to the x-axis as shown in FIG. 1 permits the angle α to represent the amount of pitch. The direction of yaw or pitch is determined by the order in which beams 1–8 are intercepted. The larger angle α, the greater the number of beams interrupted. In a developmental model of the invention, a projectile having a diameter of 20 mm would break at least 3 light beams.

Referring to FIG. 6A, there is shown a detector circuit used in each detector of photodetector arrays 14 and 16. A light-sensitive diode 35 is connected through a shielded cable 36 having a grounded shield to a two stage amplifier with a first stage comprised of an operational amplifier 37, a resistor 38, and a capacitor 39 connected in parallel with operational amplifier 37. The first stage output is connected to an input of a feedback amplifier comprising an operational amplifier 40, a feedback resistance 41 connected between the output of operational amplifier 40 and the second input thereof, and a resistor 42 connected between feedback resistance 41 and ground. The output of operational amplifier 40 is connected to a threshold detector 43 which is connected to an impedence matching resistance 44 from which an input signal is fed to the appropriate signal processing circuitry.

FIG. 6B shows a general detector circuit comprising any suitable detector 35a, such as a photodiode, connected sequentially to an amplifier 45 and a threshold detector 46. Other detector circuits than the one shown in FIG. 6A can be used. The requirement that such other circuits must meet is that their reaction time must be fast. The FIG. 6A circuit is a fast response circuit. Since the angles for pitch and yaw are found by the sequence in which beams 1–8 are intercepted as shown in FIG. 5, the array is capable of measuring velocity. For projectile 30 in FIG. 5, six detector circuits, as shown in FIG. 6A, will be tripped sequentially representing beams 2–7. The order of circuit tripping provides orientation information and the time lapse between beams 2 and 7 provides the time it takes for projectile 30 to travel a distance equal to the length of the projectile times the cosine of angle α. For a projectile with no yaw or pitch, such as projectile 29, the time the circuit detector is intercepted is the time it takes the projectile to travel its own length. Velocity is equal to the traversed distance divided by the elapsed time.

The use of the term projectile in the above description has been used in a narrow definition of military shell or bullet. However, the above apparatus will measure any object which interrupts a light beam. Thus, the definition of the word projectile should be recognized as applicable in its broadest meaning. For symmetrical projectiles, such as balls, pitch and yaw can not be determined. It is obvious to those skilled in the art that numerous uses and modifications can be made to the above apparatus.

What is claimed is:

1. A projectile analyzer for determining velocity, position, pitch, and yaw of a projectile comprising:
    a light source;
    fiber optics transmission system connected to said light source, said fiber optics transmission system configured to divide a single light beam into an output having a plurality of separate light beams, one-half of said plurality of separate light beams configured to form a first linear array of light emitters, the other half of said plurality of separate light beams configured to form a second linear array of light emitters perpendicular to said first linear array of light emitters each light emitter defining an optical path;
    first and second linear arrays of detector means for detecting light corresponding to said first and second linear arrays of light emitters, respectively, each detector means responsive to a light beam from a corresponding light emitter and located in the optical path defined thereby;
    first and second arrays of emitter polarizing filters located in the optical paths of said light emitters for polarizing the output of each said light emitter, said polarizing filters configured to provide perpendicular planes of polarization for adjacent said light emitters in said first and second linear arrays of light emitters, respectively; first and second arrays of detector polarizing filters having a polarizing filter in the optical path defined by each said emitter means with the plane of polarization of each said detector polarizing filter the same as the plane of polarization of the corresponding emitter polarizing filter; and
    first and second processing means connected to said first and second linear arrays of detector means, respectively, for processing signals from each linear array of detector means, such that each detector means in an array transmits a signal when said detector means have an interruption of the light beam incident thereon and whereby the sequence and duration of interruption of light on the detector means within an array can be used to determine the velocity, position, and orientation of a projectile as it intercepts light beams to each array and where said perpendicular arrays have axes which define the directions of pitch and yaw.

2. A projectile analyzer as described in claim 1 wherein said detector means comprises:
    a light-sensitive diode;
    an amplifier connected to said diode for amplifying the output thereof; and
    a threshold detector connected to the output of said amplifier for providing a detector output signal whenever the output of said amplifier exceeds a predetermined bias voltage.

3. A projectile analyzer as described in claim 2 wherein said light source is a xenon lamp.

4. A projectile analyzer for determining the velocity, position, pitch, and yaw of a projectile comprising:
    first and second linear arrays of emitter means for emitting continuous beams of light, said second linear array of emitter means perpendicular to said first linear array of emitter means, each emitter in said first means defining an optical path, first and second linear arrays of detector means for detecting light corresponding to said first and second linear arrays of emitter means, respectively, each detector means responsive to a light beam from a corresponding emitter means and located in the optical path defined thereby;

first and second arrays of emitter polarizing filters located in the optical paths of said first and second linear arrays of emitter means, respectively, for polarizing the output of each said emitter means, said polarizing filters configured to provide perpendicular planes of polarization for adjacent emitter means;

first and second arrays of detector polarizing filters placed in the optical paths defined by said emitter means, with the plane of polarization of each detector polarizing filter the same as the plane of polarization of the corresponding emitter means; and first and second processing means connected to said first and second linear arrays of detector means, respectively, for processing signals from each linear array of detector means, such that each detector means in an array transmits a signal when said detector means have an interruption of the light beam incident thereon and whereby the sequence and duration of interruption of light on the detector means within an array can be used to determine the velocity, position, and orientation of a projectile as it intercepts light beams to each array and where said perpendicular arrays have axes which define the directions of pitch and yaw.

5. A projectile analyzer as described in claim 4 wherein said emitter means comprises:
a light source; and
a fiber optics transmission system connected to said light source, said fiber optics transmission system configured to divide a single light beam into a plurality of separate beams.

6. A projectile analyzer according to claim 5 wherein said light source is a xenon lamp.

7. A projectile analyzer as described in claim 4 wherein each of said means for detecting light comprises:
a light-sensitive diode;
an amplifier connected to said diode for amplifying the output thereof; and,
a threshold detector connected to the output of said amplifier for providing a detector output whenever the output of said amplifier exceeds a predetermined level.

8. A projectile analyzer as described in either claim 4 or 2 wherein a spacer is provided between the plane defined by said first linear array of emitter means and said first linear array of detector means and the plane defined by said second linear array of emitter means and said second linear array of detector means.

* * * * *